United States Patent

[11] 3,571,722

[72] Inventor George D. Vendelin
Richardson, Tex.
[21] Appl. No. 666,418
[22] Filed Sept. 8, 1967
[45] Patented Mar. 23, 1971
[73] Assignee Texas Instruments Incorporated
Dallas, Tex.

[54] STRIP LINE COMPENSATED BALUN AND CIRCUITS FORMED THEREWITH
13 Claims, 9 Drawing Figs.

[52] U.S. Cl. .......... 325/445, 333/25
[51] Int. Cl. .......... H04b 1/26
[50] Field of Search .......... 325/445, 446, 449, 436; 317/234, 235; 307/73; 333/25, 26, 4, 32, 35, 8; 330/53, 66

[56] References Cited
UNITED STATES PATENTS

| | | | |
|---|---|---|---|
| 2,654,836 | 10/1953 | Beck et al. | 325/436 |
| 2,921,189 | 1/1960 | Nash | 325/436 |
| 2,951,149 | 8/1960 | Grieg et al. | 325/445X |
| 3,310,748 | 3/1967 | Putnam | 325/446 |
| 3,416,042 | 12/1968 | Thomas et al. | 325/449X |
| 3,437,935 | 4/1969 | Webb | 325/446 |

*Primary Examiner*—Richard Murray
*Assistant Examiner*—R. S. Bell
*Attorneys*—Samuel M. Mims, Jr., James O. Dixon, Andrew M. Hassell, Harold Levine, Gerald B. Epstein, John E. Vandigriff, Melvin Sharp, Richards, Harris and Hubbard, V. Bryan Medlock, Jr. and Harold E. Meier

ABSTRACT: A strip line compensated unbalanced-to-balanced converter having an inherently wide bandwidth for impedance matching or filtering in strip line applications. A two-sided printed circuit board contains the unbalanced input circuit on one side and the balanced output circuit on the opposite side in the area of the strip line circuit. By analogy, the "balun" acts like a push-pull transformer having two output signals 180 electrical degrees out-of-phase from each other. Balun circuits find application as the coupling device for connecting the local oscillator signal to a mixer circuit. Another application of a strip line balun is in a harmonic generator wherein two baluns are used, one at the input and the other at the output.

INVENTOR

GEORGE D. VENDELIN

Harold E. Meier

ATTORNEY

INVENTOR
GEORGE D. VENDELIN

Harold E. Meier

ATTORNEY

STRIP LINE COMPENSATED BALUN AND CIRCUITS FORMED THEREWITH

This invention relates to a strip line balun, and more particularly to a compensated strip line unbalanced-to-balanced converter.

Unbalanced-to-balanced converters, commonly known as "baluns," have been used for some time in high frequency circuits. Primarily, the balun has been constructed for microwave applications using either wave guide or coaxial line techniques. As the name tends to imply, the function of the balun is to convert an unbalanced grounded signal into a balanced ungrounded signal for circuits operating in a ground isolation condition.

In accordance with the present invention, a compensated strip line balun is provided wherein a grounded signal is converted into an ungrounded signal having two components displaced 180 electrical degrees. Although a few compensated coaxial line and waveguide-type baluns have been developed, their use is limited because of their size and somewhat unsatisfactory electrical characteristics. Obviously, the coaxial line and waveguide-type balun is not at all suitable for applications where size and weight are critical factors to be considered.

For example, in a strip line balanced mixer circuit, some means must be provided for connecting the local oscillator signal to the mixer circuit. A coaxial line or waveguide-type balun obviously cannot be used in an application such as this because of the incompatability of the coaxial line and waveguide design with the strip line design. Thus, heretofore in strip line balanced mixer circuits, the coupling device connecting a local oscillator signal to the mixer was usually a strip line coupler circuit consisting of several quarter-wavelength strip lines which can be larger than the mixer itself. Since one of the benefits of strip line circuitry is its small size, prior coupling devices leave something to be desired.

In accordance with the present invention, there is provided a compensated strip line balun having improved electrical characteristics over other strip line coupling circuits of comparable size. In addition, a balun in accordance with the present invention is compact and lightweight. When used in conjunction with a strip line mixing circuit, the size and weight of the balun closely matches that of the mixing circuit itself.

A compensated strip line unbalanced-to-balanced converter on an insulating substrate and having an input line consisting of two strip line sections displaced substantially parallel to each other formed on one side of the insulating substrate and a ground plane formed on the opposite side of the substrate in the area of the input line and including an isolation gap substantially parallel to the input strip line sections.

A more complete understanding of the invention and its advantages will be apparent from the specification and claims and from the accompanying drawings illustrative of the invention.

Referring to the drawings.

Figure 1:
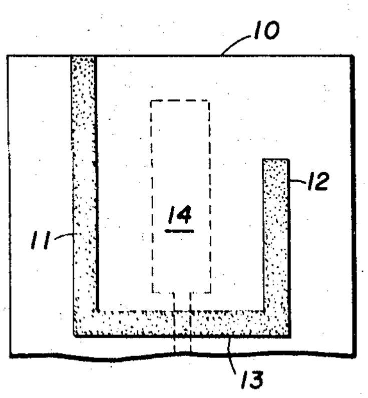
FIG. 1 is a plan view of a compensated strip line balun formed on an insulating substrate.

Referring to FIG. 1, there is shown a strip line compensated balun on an insulating substrate 10 such as a 1/32-inch Teflon-Fiberglas board. Patterned on the upper surface of the substrate 10 is an input circuit including a first strip line section 11 parallel with a second strip line section 12 interconnected by means of a strip line 13. The length of the strip line section 12 and one-half the strip line 13 is one-quarter wavelength at the center operating frequency and the strip line section 11 with half the strip line 13 also has an active length of one-quarter wavelength at the center frequency, that is, one-quarter wavelength plus an additional length for connecting the input signal to the circuit. The length of the strip line 13 is determined by the desired circuit characteristics, typically less than one-quarter wavelength.

On the opposite side of the substrate 10 from the input line there is patterned a ground plane including an isolation gap 14 one-quarter wavelength long. To provide wide bandwidth operation, the isolation gap 14 should be made as wide as possible. There are limits, however, on the width of the isolation gap 14 relative to the distance between the strip line sections 11 and 12. If the width of the gap 14 is too wide with respect to the spacing between the sections 11 and 12, the impedance of these lines will be adversely affected. For the area covered by the ground plane to yield a desired value of line impedance, it must be greater than the area of the input strip line by a factor of two.

Figure 2:
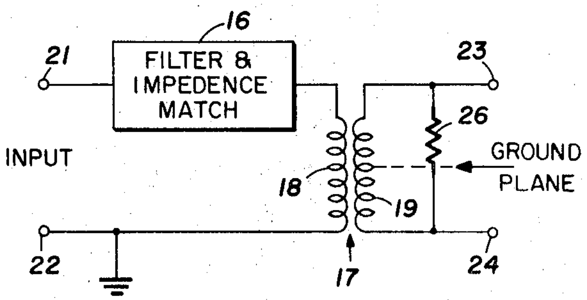
FIG. 2 is an electrical schematic of an equivalent circuit of the balun of FIG. 1.

Referring to FIG. 2, there is shown an equivalent circuit for the balun of FIG. 1 wherein the strip line sections 11 and 12 are represented by a filter and impedance-matching network 16. The coupling between the input circuit and the ground plane circuit is represented by a transformer 17 having a primary winding 18 as part of the input circuit and a secondary winding 19 as part of the ground plane circuit. The centerline of the balanced output is an imaginary ground plane. A grounded input signal connected to the input terminals 21 and 22 is converted into a balanced output signal at terminals 23 and 24. The signal at terminal 24 will be 180 electrical degrees out-of-phase with respect to the signal at terminal 23.

The input impedance for the balun of FIG. 1 as seen by a signal connected to the strip line section 11 is given by the equation:

$$Z=r+jx=\frac{jRZ_{ab}\tan\left(\frac{\pi}{2}\frac{f}{f_0}\right)}{R+jZ_{ab}\tan\left(\frac{\pi}{2}\frac{f}{f_0}\right)}-jZ_b\cot\left(\frac{\pi}{2}\frac{f}{f_0}\right) \quad (1)$$

where $Z_b$ is the impedance of the strip line section 12, $Z_a$ is the impedance of the strip line section 11, $Z_{ab}$ is the impedance of the isolation gap 14, $f$ is the operating frequency, $f_o$ is the bandwidth center frequency, and $R$ is the load resistance. With reference to the circuit shown in FIG. 2, the load resistance $R$ is illustrated by a resistor 26 connected to the terminals 23 and 24. A circuit designed according to equation (1) has a frequency bandwidth determined by the impedance $Z_{ab}$ and the circuit reactance determined by the impedance $Z_b$. The impedance of the strip line 11, $Z_a$, is usually specified and is equal to the output impedance of the signal generator supplying the input signal. For optimum impedance matching between the circuit connected to terminals 21 and 22 and the circuit connected to terminals 23 and 24, $R^2$ is selected to be approximately equal to $Z_{ab}\times Z_b$. Where impedance matching is important, the output impedance of the generator supplying the input signal to the terminals 21 and 22 is given by the equation:

$$S=Z_a=\frac{R}{2}\left(1+\frac{Z_bZ_{ab}}{R^2}\right) \quad (2)$$

where $S$ is the output impedance of the signal generator supplying the input signal.

Figure 3:
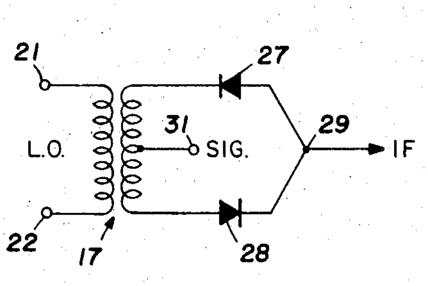
FIG. 3 is a schematic of a circuit for checking the isolation between the local oscillator signal and the mixer input signal for a balun used in a balanced mixer circuit.

Referring to FIG. 3, there is shown a schematic diagram wherein a balun of the type shown in FIG. 1 is used in conjunction with a balanced mixer circuit. The balun is represented by the transformer 17 and the mixing circuit includes diodes 27 and 28 interconnected at an IF output terminal 29 and individually connected to terminals 23 and 24. A local oscillator is connected to terminals 21 and 22 and the mixer input signal connected to terminal 31. The circuit was designed to operate at a center frequency, $f_o$, of 2.3 GHz. The wavelength in mils of a 2.3 GHz. signal is calculated as follows:

$$\lambda = 1.48 \times 2.3 \text{ GHz.} = 8.8 \text{ cm.} = 3.47''$$

$$\lambda/4 = 867 \text{ mils} \qquad (3)$$

Thus, a one-quarter wavelength line, such as the strip line sections 11 and 12, is 867 mils long. For a 50-ohm strip line section, the lines 11 and 12 are approximately 80 mils wide.

The power isolation between the local oscillator ports and the mixer signal port was tested in two separate experiments. First, a local oscillator signal was connected to the terminals 21 and 22 and the power measured at terminal 31. This test was conducted with a local oscillator supplying 30 milliwatts of power to the terminals 21 and 22. The operating frequency was made to range from approximately 0.9 GHz. to 3.8 GHz. The power isolation was found to be greater than 18 db. over this frequency range. In a second test run on the circuit of FIG. 3, power was supplied to terminal 31 and the power isolation measured at terminals 21 and 22. The resulting power isolation was greater than 21 db. over the frequency range of 0.9 GHz. to 3.8 GHz. This isolation is particularly important in applications such as a harmonic generator where two compensated baluns are operated back-to-back.

Figure 4:
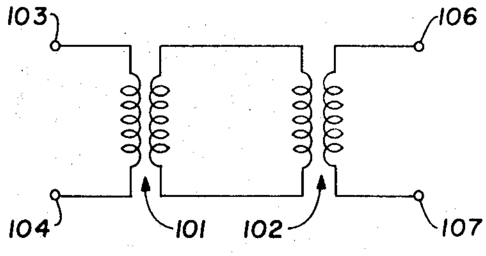
FIG. 4 is a schematic of a circuit for measuring the power losses in balun circuits.

Referring to FIG. 4, there is shown a circuit for determining the power loss of a balun of the type shown in FIG. 1. For this test two baluns are connected in a back-to-back arrangement. A first balun is represented by a transformer 101 and the second by a transformer 102. The test signal is connected to the terminals 103 and 104 and the power loss measured at the terminals 106 and 107.

Figure 5:
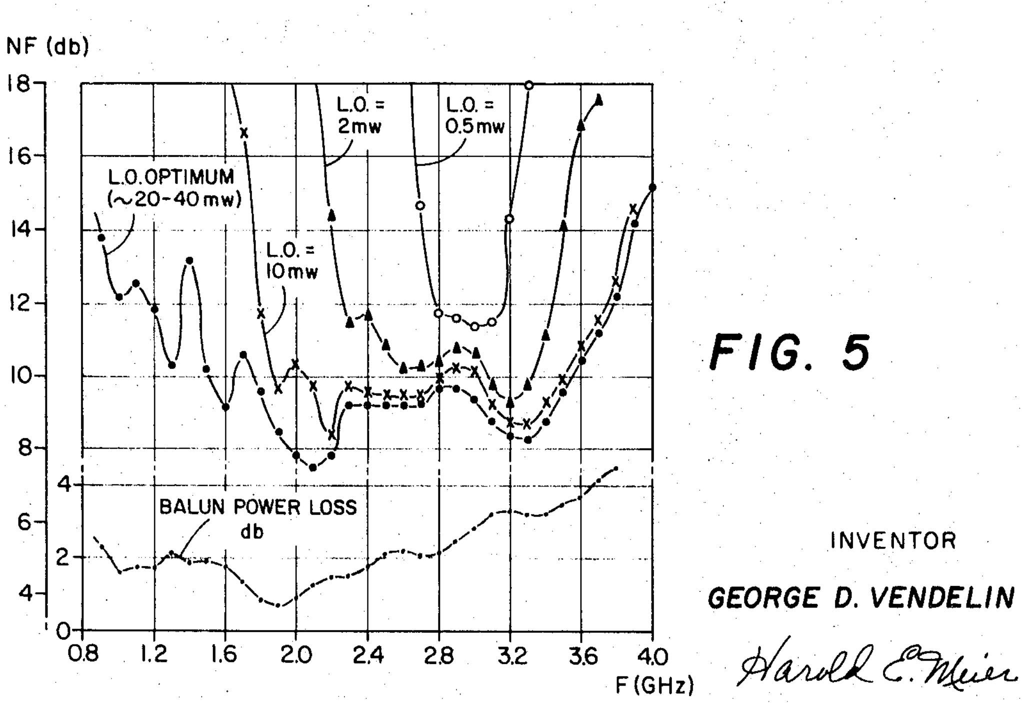
FIG. 5 is a plot of power loss and noise factor in db. versus operating frequency in GHz.

Referring to FIG. 5, there is shown a plot of test data taken from the circuits shown in FIGS. 3 and 4. The horizontal axis is the operating frequency in GHz. and the vertical axes are the balun power loss in db. as determined from the circuit of FIG. 4 and the noise figure for the mixing circuit of FIG. 3, also in db. The noise figure is plotted for a local oscillator delivery power at 0.5 milliwatts, 2.0 milliwatts, 10.0 milliwatts, and optimum power of approximately 20—40 milliwatts. Over the test range, the overall noise figure is lowest for the 20—40 milliwatts range. With respect to the balun power loss curve, it should be noted that the loss was less than 2 db. over approximately 50 percent of the test range. It should also be noted that for over approximately 75 percent of the test range, the balun power loss was less than 3 db.

Figure 6:
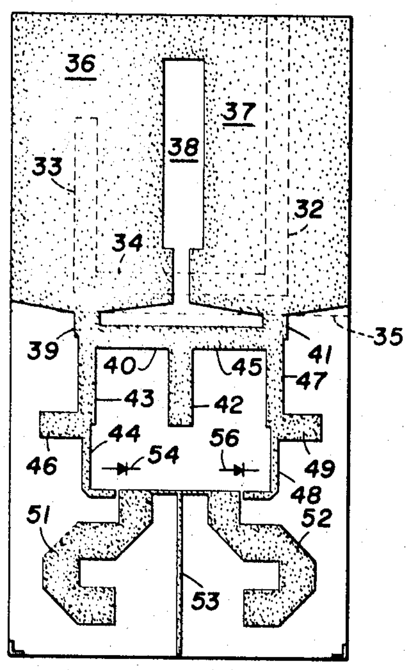
FIG. 6 is a plan view of a strip line compensated balun connected to a strip line mixer.

Referring to FIG. 6, there is shown a strip line compensated balun connected to a strip line mixer circuit. A local oscillator signal connects to an input line consisting of a first strip line section 32 parallel to a second strip line section 33 connected together by means of a strip line section 34. The lines 32 and 33 are one-quarter wavelength long to the center of the section 34 and 86 mils wide thus presenting a 50-ohm impedance line to the local oscillator. On the opposite side of the insulating substrate on which the lines 32, 33 and 34 are formed, there is a first output section 36 and a second output section 37 separated by an isolation gap 38 approximately one-quarter wavelength long and 150 mils wide. In designing a strip line balun, care must be exercised to insure that the width of the sections 36 and 37 are sufficient to overlap their respective input lines to insure a 50-ohm impedance line.

The balanced output from the balun of FIG. 6 appears at the strip lines 39 and 41. A T-shaped power-dividing strip line consisting of two matching stubs 40 and 45 connected to a strip line 42 provides a path for connecting the mixer input signal to the lines 39 and 41. Also forming a junction with the line 39 is a matching circuit consisting of a first strip line 43, a second strip line 44, a matching stub 46, and including the matching stub 40. A similar matching circuit consisting of a first strip line 47, a second strip line 48, a matching stub 49, and including the matching stub 45 forms a junction with the line 41. The output of the mixer includes a RF ground stub 51 and a RF ground stub 52 each 120 mils wide and one-quarter wavelength long connected to an output strip line 53. The output strip line 53 is a high impedance line, about 5 mils wide, and as short as possible. Interconnecting the line 44 and the stub 51 is a diode 54 and interconnecting the line 48 and the stub 52 is a diode 56. The diodes 54 and 56 are preferably silicon Schottky barrier type. On the local oscillator input line side of the substrate, in the area opposite the mixer circuit, there is formed a ground plane covering the entire lower half of the board from the dotted line 35. The spacing between this ground plane and the strip line 34 is on the order of about 60 mils.

Figure 7:
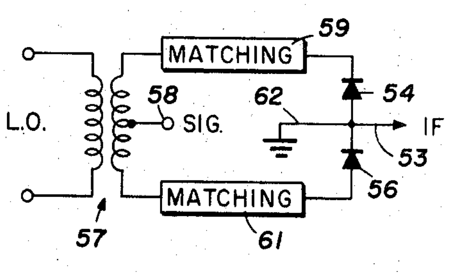
FIG. 7 is a schematic of the equivalent circuit for the device of FIG. 6.

Referring to FIG. 7, there is shown an equivalent circuit for the device of FIG. 6 wherein the balun is represented by a transformer 57 with the mixer signal connected to a terminal 58. The lines 45, 47, 48 and 49 are shown as a matching network 59 and the lines 40, 43, 44 and 46 are shown as a matching network 61. Diodes 54 and 56 are interconnected to the line 53. The stubs 51 and 52 are represented by the line 62.

In operation, a local oscillator signal is applied at the input line 32 of the balun and sees an RF impedance equal to double the RF impedance of a single diode. A mixer signal is connected to the line 42 in parallel with the diodes 54 and 56 and sees one-half the RF impedance of a single diode. Thus, the RF matching section, comprising the lines 45, 47, 48 and 49 and the lines 40, 43, 44 and 46, is a compromise which satisfied both the local oscillator and the signal-tuning requirements. The mismatch loss for a circuit of the type shown, over the signal-tuning range, was calculated to be below 0.76 db. for the mixer signal and below 1.89 db. for the local oscillator signal.

Figure 8:
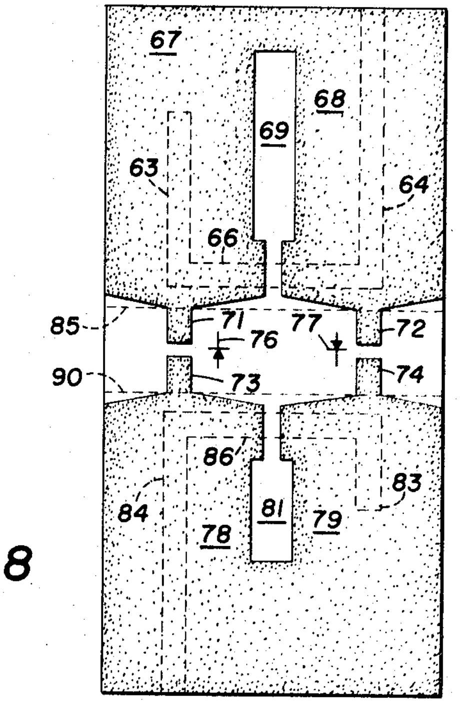
FIG. 8 is a plan view of two strip line compensated baluns connected in a harmonic generator configuration.

Referring to FIG. 8, there is shown a harmonic generator including an input balun and an output balun in a back-to-back arrangement. The input balun is designed to pass a fundamental frequency and reject all harmonics which may be reflected from the output balun. The input balun includes an input line consisting of a one-quarter wavelength strip line section 64 patterned parallel to a strip line 63 and interconnected by means of a strip line 66. The harmonic generator is formed on an insulating substrate such as Teflon-Fiberglas or $Al_2O3$ ceramic. On the opposite side of the insulating substrate from the lines 63 and 64, there is patterned a first ground plane section 67 and a second ground plane section 68 separated by a one-quarter wavelength isolation gap 69. The balanced output signal from the input balun appears at the strip line stubs 71 and 72.

The output balun is similar in construction to the input balun; however, it is designed to pass the desired output harmonic signal and reject the fundamental and all unwanted harmonics. With the input balun designed to pass only the fundamental frequency signal and the output balun designed to pass only a desired harmonic signal, a harmonic generator of the type shown in FIG. 8 has good filtering characteristics. Thus, the system connected to the input balun and the system connected to the output balun are mutually isolated from each other. As such, a balanced input signal is connected to the balun by means of strip line stubs 71 and 72 interconnected respectively to the strip lines 73 and 74 by means of diodes 76 and 77. The strip lines 71 and 73 are patterned to have an inductance that will resonate with the capacitance of the diode 76 and the strip lines 72 and 74 are patterned to resonate with the capacitance of the diode 77. In the area of the interconnecting strip lines, a circuit ground plane is patterned on the input side of the substrate between the lines 85 and 90. The line 73 is linked to a ground plane 78 which is separated from a ground plane 79, connected to the line 74, by means of an isolation gap 81. The output of the harmonic generator is taken from a circuit including a one-quarter wavelength strip line section 84 patterned parallel to a strip line section 83 and interconnected by means of a strip line 86. Strip lines 83 and 84 appear on the same side of the insulating substrate as the strip lines 63 and 64.

Figure 9:
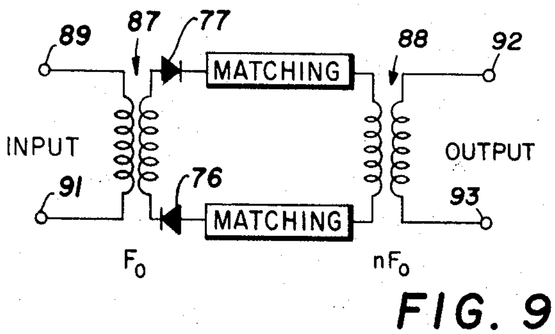
FIG. 9 is a schematic of an equivalent circuit for the harmonic generator of FIG. 8.

Referring to FIG. 9, there is shown the equivalent circuit of the harmonic generator of FIG. 8 wherein the input balun is represented by the transformer 87 and the output balun represented by a transformer 88. The diodes 76 and 77 interconnect the transformers 87 and 88. In operation, a grounded input signal is connected to the terminals 89 and 91 of the input balun and converted to a balanced signal connected to the diodes 76 and 77. An unbalanced harmonic output signal then appears on the terminals 92 and 93 of the output balun, which is designed to operate at a desired harmonic frequency.

Although the compensated strip line balun of this invention was shown with a mixer circuit in FIG. 6 and a harmonic generator in FIG. 8, other applications are considered possible. Also, while only one embodiment of the invention, together with modifications thereof, has been described in detail herein and shown in the accompanying drawings, it will be evident that various further modifications are possible in the arrangement and construction of its components without departing from the scope of the invention.

I claim:

1. A compensated strip line unbalanced-to-balanced converter comprising:
   a substrate of an insulating material;
   an input line having (two) interconnected first and second strip line sections patterned substantially parallel each other on one side of said insulating substrate;
   a first output line on the opposite side of said substrate in underlying the area of (one) the first of the sections of said input line; and
   a second output line on the same side of said substrate as said first output line underlying the area of the second strip line section of said input line.

2. A compensated strip line unbalanced-to-balanced converter as set forth in claim 1 wherein each of the strip line sections of said input line is approximately one-quarter wavelength long, and wherein the first strip line section includes a portion for receiving an input signal and the second strip line section is a reflective line.

3. A compensated strip line unbalanced-to-balanced converter as set forth in claim 2 wherein said first and second output lines are separated by an isolation gap.

4. A compensated strip line unbalanced-to-balanced converter as set forth in claim 2 wherein said isolation gap is approximately one-quarter wavelength long.

5. A compensated strip line unbalanced-to-balanced converter comprising:
   a substrate of an insulating material;
   a one-quarter wavelength input line patterned on said insulating substrate;
   a connecting strip line patterned on said substrate at one end of said one-quarter wavelength input line;
   a one-quarter wavelength reflective line patterned on said substrate at the end of said connecting strip line and substantially parallel to said one-quarter wavelength input line; and
   a ground plane formed on the reverse side of said insulating substrate covering the entire area of said lines and including an isolation gap halfway between and substantially parallel to said input line and said reflective line.

6. A compensated strip line unbalanced-to-balanced converter as set forth in claim 5 wherein said input and reflective lines are on the order of about 86 mils wide, to provide a 50-ohm input impedance.

7. A compensated strip line unbalanced-to-balanced converter as set forth in claim 5 wherein said isolation gap is on the order of about 150 mils wide and one-quarter wavelength long.

8. A compensated strip line unbalanced-to-balanced converter as set forth in claim 5 wherein said input lines, connective and reflective, are patterned substantially in a J-shape.

9. A strip line balanced mixer circuit comprising: a compensated strip line unbalanced-to-balanced converter having a local oscillator input connection and generating an output signal having two components displaced 180 electrical degrees, said converter including an input line having two strip line sections displaced substantially parallel to each other patterned on one side of an insulating substrate, and a ground plane formed on the opposite side of the insulating substrate in an area covering said input line having an isolation gap formed approximately halfway between and substantially parallel to the two strip line sections of said input line, and a mixer circuit having a first matching network connected to one component of the output signal of said converter and a second matching network connected to the second component of the output signal.

10. A balanced mixer as set forth in claim 9 wherein each of the two strip line sections of said input line are one-quarter wavelength long.

11. A strip line harmonic generator comprising: a compensated unbalanced-to-balanced converter patterned on an insulating substrate and generating an output signal having two components displaced 180 electrical degrees, a compensated balanced-to-unbalanced converter patterned on an insulating substrate and having two input signals displaced 180 electrical degrees, said converter including an input line having two strip line sections patterned substantially parallel each other on one side of the insulating substrate, a first output line patterned on the opposite side of said substrate in the area of the first strip line section of said input line, and a second output line patterned on the same side of said insulating substrate as said first output line in the area of the second strip line section of said input line, and a pair of diodes each connecting one output of said unbalanced-to-balanced converter to one input of said balanced-to-unbalanced converter.

12. A harmonic generator as set forth in claim 11 wherein said balanced-to-unbalanced converter includes:
   an output line having two strip line sections patterned substantially parallel each other on the insulating substrate;
   a first input line patterned on the opposite side of the insulating substrate in the area of the first strip line section of said output line; and
   a second input line patterned on the same side of the insulating substrate as said first input line in the area of the second strip line section of said output line.

13. A strip line harmonic generator as set forth in claim 12 wherein the output lines of said unbalanced-to-balanced converter and the input lines of said balanced-to-unbalanced converter are separated by isolation gaps formed approximately midway between and substantially parallel to said lines.